United States Patent [19]

White et al.

[11] 4,213,851

[45] * Jul. 22, 1980

[54] FLOTATION SEPARATION OF GLASS FROM A MIXTURE OF COMMINUTED INORGANIC MATERIALS USING HYDROCARBON SULFONATES

[75] Inventors: William R. White, Pomona; Gary P. Van Tighem, Ontario, both of Calif.

[73] Assignee: Occidental Petroleum Corporation, Upland, Calif.

[*] Notice: The portion of the term of this patent subsequent to Oct. 31, 1995, has been disclaimed.

[21] Appl. No.: 932,967

[22] Filed: Aug. 11, 1978

Related U.S. Application Data

[63] Continuation-in-part of Ser. No. 835,792, Sep. 22, 1977, Pat. No. 4,122,950, which is a continuation of Ser. No. 634,640, Nov. 24, 1975, abandoned.

[51] Int. Cl.$^2$ ................................................ B03B 7/00
[52] U.S. Cl. ........................................ 209/12; 209/166
[58] Field of Search ................... 209/166, 167, 12, 3, 209/4; 241/24

[56] References Cited

U.S. PATENT DOCUMENTS

| | | | |
|---|---|---|---|
| 4,067,502 | 1/1978 | Morey | 209/3 X |
| 4,122,950 | 10/1978 | White | 209/166 |

*Primary Examiner*—Robert Halper
*Attorney, Agent, or Firm*—Barry A. Bisson

[57] ABSTRACT

Particulate glass values contained in the final inorganic fraction from comminuted municipal wastes and having the particle size below 10 mesh, preferably between about 325 to about 20 mesh, are recovered by froth flotation by activating the glass surface with a bi or trivalent metal ion and using as the beneficiation reagent a water compatible sulfonated hydrocarbon.

25 Claims, No Drawings

FLOTATION SEPARATION OF GLASS FROM A MIXTURE OF COMMINUTED INORGANIC MATERIALS USING HYDROCARBON SULFONATES

CROSS REFERENCE TO RELATED APPLICATIONS

This is a continuation-in-part of U.S. Application Ser. No. 835,792 filed Sept. 22, 1977 now U.S. Pat. No. 4,122,950 which is a continuation of our U.S. Application Ser. No. 634,640 filed Nov. 24, 1975, now abandoned.

BACKGROUND OF THE INVENTION

Immense and ever increasing amounts of solid trash, particularly of a municipal nature, are being generated each day. Disposal problems are growing with equal complexity. Conventional methods of refuse disposal, such as land fill or mere incineration, are becoming prohibitively expensive or creating serious pollution problems.

In particular, land fill areas are becoming fewer in number and further from the sites where the majority of the trash is generated. Incineration, because of national concern over the problems of air pollution, is being looked at with ever increasing skepticism.

Municipalities are, therefore, turning to techniques for processing solid wastes to recover, for resale or reuse, the values contained therein. This reduces the problems of pollution and helps offset the cost of processing the trash.

A general method of processing trash involves segregating the organic matter from the inorganics which includes metals, concrete, bricks, glass and the like.

The organics may be processed for recovery as saleable materials such as paper pulp and the balance pyrolyzed to form char and a gaseous stream containing chemicals, which may be condensed as saleable commodities, and char which has an economic value of its own.

With respect to the inorganic matter, ferrous materials may be separated magnetically prior to or following separation of the organics. The remaining inorganics are comminuted by crushing or grinding into particles of fine size. Some may be separated by screening and others by heavy media separations.

The tails from the treatment of municipal wastes are a mixture of finely divided sundry inorganic materials, the most valuable constituent of which is glass. The balance of inorganic materials include fine metal particles, bone, ceramics, egg shells, brick, rock, cement, and the like. Unless recoverable, the glass in this tailing would have no value other than as filler for asphalt.

In U.S. Pat. No. 4,067,502 where one of us is a patentee, it is disclosed that amines serve as beneficiation reagents for the froth flotation of glass from the inorganic tails. Until the present invention, no other class of compounds have been established to be functional for the same purpose.

SUMMARY OF THE INVENTION

It has now been found that in a process for the separation of particulate glass from comminuted inorganic matter, such as the residue from solid wastes by a beneficiation process which involves flotation of glass particles having a particle size up to 10 mesh, preferably between about 325 and about 20 mesh, froth flotation is achieved by activating the surface of the particulate glass with metal ion having a valence of +2 or +3, and using as a beneficiating amount of at least one sulfonated hydrocarbon as the collector reagent to obtain a float comprising predominately glass particles and a tailing substantially free of particulate glass. The flotation occurs at a pH where the metal ion is associated with the glass particles.

The process of the invention, in general, involves forming a mass of particulate inorganic matter containing crushed particulate glass particles obtained, for instance, as a consequence of the several crushing and grinding operations attendant to the processing of solid wastes for recovery of the values contained therein. In the alternative, the inorganic fraction may be treated as such if the glass has already been reduced to a particle size generally less than about 10 mesh.

Preferably, the mass of particulate inorganic matter is generally screened or classified to separate out most of the metals and other inorganic residues having a particle size greater than 20 mesh. That portion of the inorganic matter which passes through the initial screening or classifying operation is deslimed and classified to remove the particles having a size smaller than about 325 mesh, preferably about 200 mesh.

To achieve separation of the particulate glass by flotation, the resultant particulate mixture is activated with an aqueous solution containing at least one metal ion having a valence of +2 or +3 or the metal ion is added with the beneficiation reagent. The metal ion serves to activate that glass particle surface to make it responsive to the sulfonated hydrocarbon beneficiation reagent. The metal ions which are used are selected from Groups IIa, IIIb, IVb, VIIa and VIII of the Periodic Table. The preferred metals are barium, calcium, aluminum, iron, manganese, magnesium, lead and the like.

The sulfonated hydrocarbons are water compatible, i.e. water soluble, miscible or dispersible and include alkyl sulfonates, aryl sulfonates, alicyclic sulfonates, alkenyl sulfonates, alkylaryl sulfonates, alicyclicaryl sulfonates and alkenylaryl sulfonates of at least 5, and preferably from about 10 to about 30 carbon atoms.

Although the amount of activator and hydrocarbon sulfonate used may vary widely as to each, typical concentrations are from about 1 to about 2 lbs per ton of glass containing a mixture of particulate inorganic materials. As there appears to be a correlation between the amount of metal ions associated with the glass and the effectiveness of the sulfonated hydrocarbon, is is preferred that equimolar amounts be used and more preferably, a molar excess of the activating metal ion.

While the sulfonated hydrocarbon may be used alone, for reasons of economy, the reagent may be extended using conventional hydrocarbon extenders such as kerosene, mineral oil, fuel oil and the like. In addition, there may be included frothers which aid in the formation of a foam such as pine oil, methyl isobutyl carbinol, methyl glycol ether and the like, as are generally known to the art.

A most unique feature of applying flotation separation of particulate glass particles from the particulate mass of inorganic matter is the comminuted residue of bricks, crushed stone and cementitious matters which remain with the residual inorganic tailing rather than becoming part of the glass float fraction.

DETAILED DESCRIPTION

According to the present invention there is provided a process for the separation of particulate glass from a mass of generally inorganic matter which may be formed as a consequence of the treatment of solid wastes for recovery of values contained therein.

The practice of the process of this invention involves the selective flotation of particulate glass from a comminuted inorganic material and involves reducing the glass particles to a size below 10 mesh, preferably between about 325 and about 20 mesh, and more preferably, from about 200 to about 28 mesh by a combination of screening, comminuting and desliming operations, then separating the particulate glass from the mass of particulate inorganic matter of similar practice size by a flotation process using as the flotation reagent at least one water compatible, i.e., water soluble, miscible or dispersible sulfonated hydrocarbon. Flotation occurs following or in conjunction with activating the surface of the glass particles by a di or trivalent metal ion. In the process, the float contains predominantly glass. That is, the glass is concentrated in the float.

Typical of the glasses to be principally beneficiated in accordance with this invention are common bottle or containiner glass, window or plate glass and iridescent lamp envelopes. They are generally known as soda-lime glasses. The analysis of such glasses is from about 70 to about 73 percent by weight $SiO_2$, from 11 to about 18 percent by weight $Na_2O$, from about 7 to about 17 percent by weight CaO, the remainder essentially being other metal oxides as colorants and the like. Included in the calcium oxide analysis is magnesium oxide MgO, a substitute for calcium oxide to reduce cost and may be present in an amount of from about 3 to about 5 percent by weight based on the total weight of the glass. The most common species is formed from a mixture of about 72 percent by weight silica, about 15 percent by weight soda, about 10 percent by weight lime and magnesia, about 2 percent by weight alumina and about 1 percent by weight miscellaneous oxides.

By the term "particulate mixture of substantially inorganic materials" as used herein, and to which the invention as a whole relates, there is meant a particulate mass containing glass particles and inorganic materials which are not, for the most part, responsive to the beneficiating action of the sulfonated hydrocarbons alone or in combination with the activator metal ions, such that the glass will concentrate in the float portion with the balance of the constituents concentrating in the tailings. It is appreciated, however, that materials responsive to the beneficiating action of the sulfonated hydrocarbons will also appear as constituents of the float, as will materials which respond merely to aeration which is incident to any flotation operation such as talc or mica or will float mainly because of density. The latter constituents include any inorganic residues remaining on the particle surfaces. For run of the mill inorganic materials which are the residue of waste treatment operations, the amounts of these materials are quite small and, therefore, there is a true concentration of the glass in the float fraction. Of particular value is the ability to selectively float glass from quartz on glass sand, i.e. essentially pure $SiO_2$.

By the term "sulfonated hydrocarbons" there is meant sulfonated saturated and unsaturated hydrocarbons, such as sulfonated alkyls, alicyclics, aryls, alkenyls, alkylaryls, alicyclicaryls, alkenylaryls and the like in which the sulfonate is in the acid or salt state. Sulfonated hydrocarbons are generally obtained by a partial or total sulfonation of olefinically unsaturated compounds as well as sulfonation of aryl groups.

Some techniques of their preparation are more particularly set forth in British Pat. No. 983,056 and French Pat. No. 1,419,652, incorporated herein by reference. Useful, but nonwise a limiting of the olefins which may be sulfonated for use in the practice of this invention, are the pentenes, hexenes, heptenes, octenes, nonenes, decenes, undecenes, dodecenes, tridecenes, tetradecenes, pentadecenes, hexadecenes, octadecenes, nondecenes, eicosenes, heneicosenes, doeicosenes, trieicosenes, tetraeicosenes, pentaeicosenes, hexaeicosenes, octaeicosenes and like arylalkenes as well as mixtures thereof.

Based on the same group of alkenes described above, the alkyl and arylalkyl sulfonates are obtained by reacting the corresponding olefin with an alkaline bisulfite under free radical conditions, as more particularly set forth, for instance, in U.S. Pat. Nos. 2,653,970; 3,084,186 and 3,168,555, which are incorporated herein by reference. They may also be prepared by the addition of hydrogen sulfide to an α-olefin to give a mercaptan followed by oxidation to the sulfonate; the addition of an olefin to thioacetic acid to give a thioester, which is then oxidized to the sulfonate; and the addition of hydrogen bromide to the olefin to give an alkyl bromide, which is converted to a sulfate by the addition of sodium sulfite.

The functional sulfonated hydrocarbons contain at least 5, preferably on the average from about 10 to about 30 carbon atoms in the compound and are water compatible, i.e. water soluble, water miscible, or water dispersible. The most common sulfonated hydrocarbons are the alkyl benzene sulfonates and sulfonated petroleum fractions, the latter typically containing on the average from about 18 to about 24 carbon atoms.

The amount of sulfonated hydrocarbon required to achieve effective separation of particulate glass from a generally nondescript grouping inorganic matter is not narrowly critical and will depend in part upon the glass content of the grouping as well as whether an extender and/or a frothing agent is used.

For the run of the mill, finely divided inorganic residue which may be found as the trailing from the treatment of solid wastes, there may be employed from about 0.15 lb. to about 2 lbs. per ton of particulate mass of substantially inorganic materials, preferably from about 0.5 lb. to about 2 lbs. per ton.

As indicated, there may be used an extender which serves, in general, to reduce the cost of the collector reagent used in the beneficiation flotation operation, particularly where the sulfonated hydrocarbon is fairly high in cost. Extenders used are generally conventional to the art and include among others, kerosene, fuel oil, mineral oil, bunker C oil, Stoddard's solvent and the like. When employed, the extender is normally present in the amount of about from 0 to about 3 lbs. per ton or inorganic residue.

Although not necessary to the practice of the process of this invention, there may be included conventional frothing aids such as pine oil, methyl-isobutyl carbinol, 2-ethylisohexanol, methyl amylalcohol, polypropylene glycol and methylglycolether and the like. In general, the amount of frothing agent which may be included in the flotation system may range from 0 to about 0.5 lbs. per ton of the inorganic residue processed.

Essential, however, to the practice of this invention is surface activation of the glass particles by treatment with or the presence of at least one bi or trivalent metal ion selected from Groups IIa, IIIb, IVb, VIIa and VIII of the Periodic Table defined by Mendeléeff, published as the Periodic Chart of the Atoms by W. N. Welch Manufacturing Company and incorporated herein by reference. The preferred metals are barium, calcium, aluminum, iron (ferrous and ferric), manganese, magnesium, lead and the like as well as mixtures thereof.

Surface activation may be achieved by conditioning as by washing the mixture of inorganics with an aqueous solution of salts of the ionic metals in the process of removing slimes or the like which leave a residue of the ions on the glass particles. In the alternative, the metal ion can be combined directly with the sulfonated hydrocarbon in a suitable flotation cell, such as a Denver or Wemco cell. Pretreatment, however, is preferred whether or not in a separate holding tank to maximize the effectiveness of the process. Typically, contact times of 1 to 5 minutes or more with the activator metal ions will maximize effectiveness of the sulfonated hydrocarbon reagents.

Typical metal ion concentration can range from 0.15 to about 2 lbs. per ton of particulate inorganic material, preferably from about 0.5 to about 2 lbs. per ton.

In the practice, the amount of metal ion used is a function of the amount of sulfonated hydrocarbons employed. There appears to be about a 1:1 molar requirement for the metal ion associated with glass particles and the amount of sulfonated hydrocarbon active as the flotation reagents. Therefore, it is recommended that at least a 1:1 molar ratio be used. At lower molar ratios, excess sulfonated hydrocarbon will be present and may serve no material benefit.

Effectiveness of the metal ions as activators is achieved by suitable pH control over the aqueous media, in which activation and froth flotation occurs, as it is essential there be some chemical association between the metal ions and the glass particles. Table 1 shows the optimum pH range of the aqueous flotation medium depending on the principal metal ion present.

TABLE 1

| Metal Ion | Optimum pH Range |
| --- | --- |
| $Ba^{++}$ | 6–14 |
| $Ca^{++}$ | 6–12 |
| $Al^{+++}$ | 4–12 |
| $Fe^{++}$ or $Fe^{+++}$ | 3–12 |
| $Mn^{++}$ | 6–12 |
| $Mg^{++}$ | 6–12 |
| $Pb^{++}$ | 7–12 |

While not bound by theory, within the prescribed pH ranges there is a maximum association of the metal ion with the oxides of glass by some chemical bond as opposed to tendency of the metal ion to remain in solution. pH control as required is achieved by the addition of acids, bases and buffering agents.

As will be appreciated, the metal ions may be provided in whole or in part by metal ions clinging or associated with the glass in the inorganic mass to be subject to froth flotation as a consequence of the nature of previous treatments for different purposes.

While the process of this invention may be applied for the flotation separation of particulate glass from any finely divided aggregate of inorganic matter, it will be particularly described in terms of treatment of the tailings of a process for recovery of values from solid wastes.

Such an operation may begin by separating large paper stock by elutriation prior or subsequent to separation of the ferrous materials by conventional magnetic separation means. Independent of whether these preparatory operations are carried out, the balance of the trash is normally comminuted using conventional crushing and grinding operations and classified into an organic fraction and inorganic fraction.

Some portion of the organic fraction is generally formed into paper pulp for resale and the balance of residue pyrolyzed to form char and a gaseous stream containing recoverable chemicals.

As indicated, magnetic separation is generally employed at some point to separate from the waste ferrous materials which are, in turn, processed by various means to maximize the scrap value of the ferrous materials.

What generally follows is a series of comminuting, crushing and screening operations including the possibility of treatment with chemical reagents to recover, to the extent possible, the remaining metallic constituents such as copper, aluminum, brass and the like.

Soft metals, for instance, may be flattened as a consequence of crushing of the more friable materials and recovered by screening operations.

As more and more of the contained values are recovered by crushing, screening and heavy media separations, a finer residue of inorganic materials generally remains.

One of the more difficult constituents of this inorganic residue to separate as a clean fraction is glass. Glass is normally crushed to a fine state along with bricks, rock, concrete and similar cementitious materials in the several operations carried out during the processing of waste solids for the initial recovery of valuable metals. This residue may contain a variety of materials ranging from crushed metal particles which have eluded the separations, crushed brick, rock, concrete and glass and even egg shells which form a generally nondescript inorganic tailing fraction.

An initial separation of a fraction containing particulate glass from the balance may be made by a screening operation. To achieve flotation in accordance with the practice of this invention, it is preferred to employ screening operations which will eventually pass particles containing the glass and be finer than about 20 mesh. If there has been incomplete crushing of the glass particles prior to this stage additional finer comminution operations may be employed to further reduce particle size.

An initial screening operation may, for instance, be employed to separate a good portion of the sand, dirt and miscellaneous solids having a particle size greater than 20 mesh. The inorganic residue remaining and containing the glass particles may also be subjected, if desired, to heavy media separation wherein materials having a density equal to, or less than, the materials of a density greater than the media are floated off by merely filling a vessel containing the nondescript inorganic residue with the heavy media to an overflowing state such that the heavy media will carry away from the denser inorganic materials, glass materials and other materials of equivalent or lower density. This, as indicated, has proven to be an unsatisfactory separation where it is desired to free the glass fraction of comminuted brick and other cementitious materials. That resultant agglomerate finding only limited utility as "glasphalt" for road repairs.

There is, therefore, carried out in accordance with the practice of this invention, a process for providing a glass fraction which is essentially free of other materials. As previously indicated, the first stage is to form an inorganic fraction having a particle size less than about 20 mesh. This fraction is then deslimed and classified to form a mixture comprising particles of greater than 325 mesh, preferably greater than about 200 mesh. These fines are removed from the system as a slime and may be discarded.

In particular, the inorganic fraction containing the crushed glass can be prepared by initially feeding the inorganic residue containing the glass to a crushing device which uses a compressive action rather than shear functions to achieve compaction of the softer metals for screening. Examples of such comminution devices include gyratory crushers, cone crushers, roll crushers, rod mills, jaw crushers and the like. The use of a rod mill for both the flattening and grinding operations is especially effective.

Friable or brittle materials, including any large glass particles, are broken into small fragments which pass through the screening operations while the more ductile materials are flattened for separation by screening. Where heavy metals are present, fine crushing is preferred to coarser crushing or extensive grinding.

After the desliming operation which may involve washing with an aqueous solution containing the inorganic residue which has a particle size between about 20 and 325 mesh, is then passed to a conventional flotation cell where there is added a beneficiating amount of at least one sulfonated hydrocarbon with or without an extender and/or a frothing agent to cause froth flotation of the glass. If the metal ion is not used in the wash or the wash eliminated, the activating salt is added with the flotation reagent metal ions to activate the glass particle surface. The glass fraction obtained may be characterized by the substantial absence of finely crushed brick, rock and cementitious materials but may contain magnetic materials. This fraction may be passed through additional flotation separation procedures to achieve an even finer purification of the glass fraction, the inorganic residue which remains after each froth flotation is either processed for recovery of values contained therein or discarded. If there is carried over with the glass ferromagnetic materials as slag, the slag can be separated from the glass by a conventional magnetic separator.

A particular advantage of the process of this invention is that the particle size of the glass formed as a consequence of the flotation operation is of particular utility for direct feed to glass fabricating operations for the formation of glasses, containers and like objects.

While the process of this invention has been described primarily in terms of obtaining a pure glass fraction by flotation during the processing of solid wastes, it will be appreciated by one skilled in the art that the process may be employed for obtaining a pure glass fraction from many mixtures of glass and generally inorganic matter by reducing particle size of the mixture to a size compatible with the flotation operation and then floating the glass fraction from the balance of the inorganic matter.

EXAMPLE 1

A 50% slurry containing 300 parts by weight of an inorganic glass containing waste separated from municipal trash and ground to a particle size of $-20$ to $+200$ mesh was subjected to froth flotation in the Wemco cell. Glass activation was achieved by the addition of about 1.5 lb/ton of $CaCl_2$. About 1.5 lb/ton of Petronate L, a petroleum sulfonate manufactured and sold by the Sonneborn Division of Witco Chemical Co., Inc., was used as the flotation reagent.

The aqueous medium was alkaline and activation time was 5 minutes. Air was introduced and a rough concentrate of about 250 parts by weight was recovered. The rougher concentrate was cleaned once. The results are shown in Table 2.

Table 2

|  | Wt (parts) | Glass Purity % |
| --- | --- | --- |
| Feed | 300 | 66 |
| Concentrate | 160 | 98 |
| Middlings | 86 | 50 |
| Tails | 50 | 10 |

The middlings were recycled to the rougher concentrate to enhance recovery while the tails were scavenged to a final tail and the concentrate from the scavenger recycled to the rougher. Overall glass recovery from the feed was in excess of 90%.

EXAMPLE 2

Example 1 was repeated except that the particulate inorganic mass containing the glass was conditioned for 10 minutes with 1.5 lb/ton of $CaCl_2$. Calcium hydroxide was added to adjust ph to between 10 and 11. The hydrocarbon sulfonate was Petroflote 462 Petroleum Sulfonate, an alkylaryl petroleum sulfonate manufactured and sold by Witco Chemical Company. Concentration was 1 lb/ton of the inorganic mass. The glass was clearly floated in one pass as per Table 3.

Table 3

|  | Weight (Parts) |
| --- | --- |
| Feed | 300 |
| Cleaner | 160 |
| Middlings | 86 |
| Tails | 50 |

EXAMPLE 3

Example 2 was repeated using 1.5 lb/ton of $BaCl_2$ as the activator. Sodium hydroxide was added to adjust pH to 11. The sulfonated hydrocarbon added in a concentration of 1.0 lb/ton of particulate inorganic solids was Aeropromoter 801, a straight chained hydrocarbon sulfonate manufactured and sold by American Cyanamid Company. The results are shown in Table 4 wherein a clean glass concentrate was obtained as the float in one pass.

Table 4

|  | Weight (Parts) |
| --- | --- |
| Feed | 300 |
| Cleaner | 167 |
| Middlings | 75 |
| Tails | 53 |

EXAMPLE 4

Example 2 was repeated using 1 lb/ton of $Pb(NO_3)_2$ as the activator and by adjusting pH to between 10 and 11 using NaOH. Sodium octadecenyl sulfonate was used as the beneficiation reagent in a concentration of 300 grams/ton of particulate inorganic materials. In the cleaner fraction shown in Table 5, the glass was highly concentrated.

Table 5

|  | Weight (Parts) |
| --- | --- |
| Feed | 300 |
| Cleaner | 172 |
| Middlings | 67 |
| Tails | 58 |

The following Examples show the uniqueness of glass as against quartz.

EXAMPLE 5

There was formed a mixture of 50 grams of particulate glass having a particle size range of between 100 mesh and 200 mesh and 50 grams of quartz having a mesh size between 60 and 100 mesh. The physical mixture of particles were added to a Wemco lab flotation cell with water and calcium oxide. Calcium oxide added was to provide a bivalent metal ion, and was sufficient to reach a pH of 9. Aeropromoter 870 TM, a petroleum sulfonate manufactured and sold by American Cyanimid Company, was added in an amount equivalent to about 0.2 pounds per ton of the mixture of particles.

The results of rougher and cleaner flotations are shown in Table 6 wherein glass recovery in the rougher flotation alone was 82.2%. Losses were mechanical.

Table 6

| | Rougher Flotation | |
| --- | --- | --- |
| Component | Grams | Composition |
| Original Mix | 100 | 50% glass, 50% quartz |
| Rougher Float | 56.3 | 73.3% glass, 26.7% quartz |
| Rougher Tailings | 42.6 | 22.6% glass, 77.4% quartz |

| | Cleaner Flotation | |
| --- | --- | --- |
| Component | Grams | Composition |
| Rougher Float | 56.3 | 73.3% glass, 26.7% quartz |
| Cleaner Float | 39.0 | 82.3% glass, 17.7% quartz |
| Cleaner Tailing | 17.00 | 46.0% glass, 54.0% quartz |

EXAMPLE 6

Following the procedure of Example 5, a mixture of 50% by weight glass and 50% by weight quartz was formed. All particles were less than 100 mesh and more than 200 mesh. There was employed $Ba^{++}$ added as barium sulfate as the activator for the surface of the glass and a petroleum sulfonate, Petronate L, manufactured and sold by Sonneborn Div. of Witco Chemicals, as the collector reagent. The collector reagent was added to an amount equivalent to about 0.2 pounds per ton of particles. pH was 11. In conducting a flotation separation in a Wemco laboratory flotation cell, the following results were obtained:

Composition of float, % by weight: 65% glass, 35% quartz

Composition of tailing, % by weight: 20% glass, 80% quartz

% of Glass Recovered: 88%

The amount of glass in the float and tailing was determined by CaO analysis.

In additional experiments it has been established that under certain conditions of pH, quartz and glass will appear together in the float, and at conditions of pH outside the scope of this invention, quartz can be floated from glass.

What is claimed is:

1. A process for the recovery of glass from solid wastes which comprises activating the surface of glass particles contained in a particulate mixture of glass containing inorganic materials formed from municipal solid waste and having a particle size up to about 10 mesh with at least one metal ion in a divalent or trivalent state and selected from metals of Groups II(a), III(b), IV(b), VII(a) and VIII of the Periodic Table at a pH where the metal ion chemically associates with the glass particles and at a pH where the metal ion remains chemically associated with the glass particles, to the action of a beneficiating amount of a collector reagent which is at least one water compatible sulfonated hydrocarbon containing at least 5 carbon atoms to form a float fraction comprising predominantly glass particles and an inorganic tailing of reduced glass content and including inorganic materials, exclusive of particulate glass particles, which are non-responsive to the beneficiating action of the collector reagent.

2. A process as in claim 1 wherein said mixture comprises glass containing less than about 73% by weight $SiO_2$.

3. A process for the recovery of glass from solid wastes which comprises activating the surface of glass particles contained in a particulate mixture of glass containing substantially inorganic materials formed from municipal solid waste and having a particle size between about 325 and 20 mesh with at least one metal ion in a divalent or trivalent state and selected from metals of Group II(a), III(b), IV(b), VII(a) and VIII of the Periodic Table at a pH where the metal ion chemically associates with the glass particles and at a pH where the metal ion remains chemically associated with the glass particles, to the action of a beneficiating amount of a collector reagent which is at least one water compatible sulfonated hydrocarbon containing at least 5 carbon atoms to form a float fraction comprising predominantly glass particles and in inorganic tailing of reduced glass content and including inorganic materials, exclusive of particulate glass particles, which are non-responsive to the beneficiating action of the collector reagent.

4. A process as claimed in claim 3 in which the metal ion is selected from the group consisting of $Al^{+++}$, $Ba^{++}$, $Ca^{++}$, $Fe^{++}$, $Fe^{+++}$, $Mg^{++}$, $Mn^{++}$, $Pb^{++}$ and mixtures thereof.

5. A process as claimed in claim 4 in which the water compatible sulfonated hydrocarbon contains from about 10 to about 30 carbon atoms.

6. A process as claimed in claim 3 in which the water compatible sulfonated hydrocarbon contains from about 10 to about 30 carbon atoms.

7. A process as claimed in claim 3 in which the glass is activated by contact with the metal ion prior to contact with the sulfonated hydrocarbon.

8. A process as claimed in claim 3 in which the molar ratio of metal ion to sulfonated hydrocarbon is at least about 1 to 1.

9. A process as claimed in claim 8 in which the sulfonated hydrocarbon is used in a concentration of from about 0.15 to about 2 lbs. per ton of the particulate mixture of glass containing substantially inorganic materials.

10. A process as claimed in claim 8 in which the sulfonated hydrocarbon is used in a concentration of from about 0.5 to 2 lbs. per ton of the particulate mixture of glass containing substantially inorganic materials.

11. A process as claimed in claim 3 in which the sulfonated hydrocarbon is used in a concentration of from about 0.15 to about 2 lbs. per ton of the particulate mixture of glass containing substantially inorganic materials.

12. A process as claimed in claim 4 in which the sulfonated hydrocarbon is used in a concentration of from about 0.5 to 2 lbs. per ton of the particulate mixture of glass containing substantially inorganic materials.

13. A process as claimed in claim 3 in which an extender for the sulfonated hydrocarbon is present.

14. A process as claimed in claim 3 in which the particulate mixture of glass containing substantially inorganic materials is of a particle size between about 200 and 20 mesh.

15. In a process for the treatment of solid wastes for recovery of values contained therein which includes classifying the solid waste into a generally organic fraction, a metals fraction and an inorganic tailing including glasses, said inorganic tailing being substantially free of organics and metals, the improvement which comprises:
   (a) forming from the inorganic tailing a particulate inorganic mass of particles including glass having a particle size between about 325 and about 20 mesh;
   (b) activating the glass particles by contact with at least one divalent or trivalent metal ion selected from Groups II(a), III(b), IV(b), VII(a) and VIII of the Periodic Table and subjecting the particulate inorganic mass containing the activated glass to froth flotation with a beneficiating amount of at least one water compatible sulfonated hydrocarbon collector reagent, a said sulfonated hydrocarbon containing at least about 5 carbon atoms to form a float fraction predominately comprising said particulate glasses and an inorganic residue substantially free of said glasses, the activation of said glass particles and froth flotation occurring at a pH where the metal ion is associated with the glass particles.

16. A process as claimed in claim 15 in which the metal ion is selected from the group consisting of $Al^{+++}$, $Ba^{++}$, $Ca^{++}$, $Fe^{++}$, $Fe^{+++}$, $Mg^{++}$, $Mn^{++}$, $Pb^{++}$ and mixtures thereof.

17. A process as claimed in claim 15 in which the water compatible sulfonated hydrocarbon contains from about 10 to about 30 carbon atoms.

18. A process as claimed in claim 15 in which the glass is activated by contact with the metal ion prior to contact with the sulfonated hydrocarbon.

19. A process as claimed in claim 15 in which the molar ratio of metal ion to sulfonated hydrocarbon is at least about 1 to 1.

20. A process as claimed in claim 15 in which the sulfonated hydrocarbon is used in a concentration of from about 0.15 to about 2 lbs. per ton of the particulate mass of substantially inorganic materials.

21. A process as claimed in claim 22 in which the sulfonated hydrocarbon is used in a concentration of from about 0.15 to about 2 lbs. per ton of the particulate mass of substantially inorganic materials.

22. A process as claimed in claim 20 in which the sulfonated hydrocarbon is used in a concentration of from about 0.5 to 2 lbs. per ton of the particulate mass of substantially inorganic materials.

23. A process as claimed in claim 15 in which the sulfonated hydrocarbon is used in a concentration of from about 0.5 to 2 lbs. per ton of the particulate mass of substantially inorganic materials.

24. A process as claimed in claim 15 in which the extender for the sulfonated hydrocarbon is present.

25. A process as claimed in claim 15 in which the particulate mixture of substantially inorganic materials is of a particle size between about 200 and 20 mesh.

* * * * *